United States Patent
Nakaie

[11] Patent Number: 6,049,409
[45] Date of Patent: Apr. 11, 2000

[54] OPTICAL SCANNING DEVICE AND AN IMAGE FORMING APPARATUS WITH THE SAME

[75] Inventor: Katsuhiko Nakaie, Ebina, Japan

[73] Assignee: Fuji Xerox Co., Ltd., Tokyo, Japan

[21] Appl. No.: 09/028,999

[22] Filed: Feb. 25, 1998

[30] Foreign Application Priority Data

Feb. 26, 1997 [JP] Japan ..................................... 9-042742

[51] Int. Cl.[7] .................................................. G02B 26/08
[52] U.S. Cl. .......................... 359/216; 359/197; 359/201; 359/205; 347/261
[58] Field of Search ..................................... 359/196, 197, 359/201, 204, 205, 206, 207, 208, 212, 216, 217, 218, 219; 347/243, 259, 260, 261

[56] References Cited

U.S. PATENT DOCUMENTS

| | | | |
|---|---|---|---|
| 3,873,180 | 3/1975 | Bousky | 359/205 |
| 4,759,593 | 7/1988 | Kessler | 359/217 |
| 4,796,962 | 1/1989 | DeJager et al. | 359/217 |
| 4,960,312 | 10/1990 | Razzaghi | 359/205 |

FOREIGN PATENT DOCUMENTS

| | | |
|---|---|---|
| 64-79720 | 3/1989 | Japan . |
| 7-27991 | 1/1995 | Japan . |

*Primary Examiner*—Darren E. Schuberg
*Attorney, Agent, or Firm*—Oliff & Berridge, PLC

[57] ABSTRACT

A laser beam that is emitted from a light source is reflected by a first mirror, and then incident on each facet of a polygon mirror. The laser beam is moved for scanning in the fast scan direction by the facet, and reflected again by the first mirror. Since the laser beam is reflected two times by the first mirror, the first mirror may be located close to the polygon mirror, and hence the optical scanning device may be reduced in the size thereof. The incident angle of the incident light beam projected onto the polygon mirror and the reflecting angle of the reflecting light beam reflected by the polygon mirror, may be small. This fact leads to little curving of the scanning line.

16 Claims, 9 Drawing Sheets

OPTICAL SCANNING DEVICE AND AN IMAGE FORMING APPARATUS WITH THE SAME

BACKGROUND OF THE INVENTION

The present invention relates to an optical scanning device and an image forming apparatus using the same. More particularly, the invention relates to an optical scanning device of the type in which a light beam emitted from a light source is incident on a rotary polygon mirror while being slanted in the slow scan direction with respect to a plane that is oriented at a right angle to the rotary shaft of a rotary polygon mirror, and an image forming apparatus using the same.

The optical scanning device in use with the image forming apparatus, e.g., a laser printer, a digital copier or the like, is disclosed in the Unexamined Japanese Patent Application Publication Nos. Sho 64-79720 and Hei 7-27991. In the disclosed optical scanning device, a laser beam is incident on a mirror surface or facet of a rotary polygon mirror at a given incident angle with respect to a plane that is oriented at a right angle to the rotary shaft of a rotary polygon mirror. Then, the laser beam is reflected on the facet of the polygon mirror at a reflecting angle that is equal to the incident angle, while being deflected.

In the optical scanning device disclosed in the Unexamined Japanese Patent Application Publication No. Sho 64-79720, a light beam (or laser beam) emitted from a laser source is reflected by a reflecting mirror and incident on a rotary polygon mirror; the light beam from the polygon mirror is passed through a correction lens; the light beam emanating from the correction lens is successively reflected by a couple of reflecting mirrors; and the reflected light beam is projected on the surface of a photoreceptor drum. In the optical scanning device disclosed in the Unexamined Japanese Patent Application Publication No. Hei 7-27991, a light beam that is emitted from a light source is reflected by a plane mirror; the light beam successively passes through a couple of lenses; and the light beam emanating from the lenses is projected onto the facet of the polygon mirror. The light beam reflected by the polygon mirror passes through the two lenses again, and are incident on the surface to be scanned.

The optical scanning device disclosed in the Unexamined Japanese Patent Application Publication No. Hei 7-27991 has the following problem. With the beam width of the light beam when viewed in the slow-scan direction, the incident side mirror possibly interrupts an optical path of the reflection side mirror. To avoid the interruption, the incident side mirror must be disposed greatly apart from the polygon mirror. The result is that the optical scanning device is increased in size in the direction in which the light beam that is reflected by the polygon mirror advances.

In a case where an incident angle or a reflecting angle of the light beam with respect to the reflecting surface or facet 26A of the polygon mirror 26 is large, the light beam reflected and deflected by the polygon mirror 26 lands on the surface of the photoreceptor drum while depicting a locus along a curved surface. The result is that the light beam depicts a curved locus on the surface of the photoreceptor drum. (The behavior of the light beam under this condition is illustrated in FIG. 9.)

To avoid such the curving of the light beam, the necessity is to decrease the incident or reflecting angle of the light beam on the facet of the polygon mirror 26.

To decrease the incident or reflecting angle of the light beam on the polygon mirror facet 26A in the conventional optical scanning device including the first reflecting mirror for directing the light beam coming from the light source to the polygon mirror 26, and the second reflecting mirror for receiving the light beam from the polygon mirror 26 and directing it to the photoreceptor drum, those mirrors must be disposed such that the mirrors do not interrupt the related light beams or the optical paths of the same. Specifically, design necessity is to dispose those mirrors such that the first reflecting mirror does not interrupt the light beam reflected by the polygon mirror 26, and that the second reflecting mirror does not interrupt the light beam to be incident on the polygon mirror 26. In other words, the first and second reflecting mirrors are disposed so that the light beam reflected by the polygon mirror 26 is greatly spaced apart from the light beam incident on the polygon mirror 26.

Where the first and second reflecting mirrors are so disposed, the spatial distances between the mirrors and the polygon mirror 26 are greatly large. This entails an increase of the size of the optical scanning device.

SUMMARY OF THE INVENTION

Accordingly, a first object of the present invention is to provide an optical scanning device which is reduced in size, and has reduced incident and reflecting angles of the light beam to and from the polygon mirror, thereby preventing the scanning line from being curved, and is free from the interruption of the optical path by the optical element.

A second object of the present invention is to provide an image forming apparatus which is reduced in size, and has reduced incident and reflecting angles of the light beam to and from the polygon mirror, thereby preventing the scanning line from being curved, and is free from the interruption of the optical path by the optical element.

To achieve the first object, the first invention provides an optical scanning device comprising:

a light source for emitting a light beam;

a polygon mirror for receiving the light beam from the light source and reflecting the light beam, the light beam being reflected while being moved in a fast scan direction with the rotation of the polygon mirror; and a reflecting member having a reflecting surface positioned in a plane, the reflecting surface receiving the light beam from the light source and reflecting the light beam toward the polygon mirror, the light beam reflected by the reflecting surface being obliquely incident on each facet of the polygon mirror from a point above another plane perpendicular to the rotary shaft of the polygon mirror, and the reflecting surface of the reflecting member receiving the light beam reflected by each face of the polygon mirror and reflecting again the received light beam.

The light beam emitted from the light source is reflected by the reflecting member; it is incident on the polygon mirror and moved in the fast slow direction; and it is reflected again by the reflecting member. The light beam to be incident on the polygon mirror will be referred to as a "incident light beam". The light beam reflected by the polygon mirror will be referred to as a "reflecting light beam".

The light beam is reflected two times by the reflecting member having a reflecting surface positioned in a plane. Because of this unique feature, the reflecting member may be disposed close to the polygon mirror while not interrupting the optical axis of the optical path. The result is to reduce the size of the optical scanning device. The incident angle of the incident light beam and the reflecting angle of the reflecting light beam may be small. This fact leads to little curving of the scanning line.

In the optical scanning device of the invention, the reflecting member may includes a first reflecting mirror.

With this feature, the number of required optical elements is more reduced than that in a case where the reflecting member includes different reflecting mirrors, for example.

In the optical scanning device of the first invention, the reflecting member may be disposed so that the light beam to be incident on the polygon mirror is directed to the axis of the rotary shaft of the polygon mirror.

The incident light beam may be incident on the polygon mirror in a called front-incidence manner. With this uniqueness, the curving of the scanning line that is moved for scanning by the polygon mirror is symmetrical with respect to the slow scan plane, thereby correcting the curving of the picture in the slow scan direction. Further, the width of the light beam projected onto each facet of the polygon mirror is minimized, so that the facet width of the polygon mirror may be decreased and the polygon mirror may be reduced in size.

In the optical scanning device of the first invention, an fθ-lens may be disposed so as to allow the light beam to be incident on the polygon mirror and the light beam reflected by the polygon mirror to pass therethrough.

Both the incident light beam and the reflecting light beam pass through the fθ-lens. That is, the fθ-lens is a so-called double-pass optical element. Therefore, the incident angle and the reflecting angle of the light beam to and from the polygon mirror may be reduced, leading to improvement of the picture quality.

In the optical scanning device of the first invention, the fθ-lens may be disposed between the polygon mirror and the reflecting member.

The optical paths of the incident and reflecting light beams are separated from each other by a small space between the polygon mirror and the first mirror. Therefore, where the double-pass fθ-lens allowing the incident and reflecting light beams to pass therethrough is disposed between the light source and the polygon mirror, the fθ-lens may be reduced in size.

In the optical scanning device of the first invention, a second mirror may be disposed between the light source and the reflecting member. The second mirror reflects the light beam emitted from the light source toward the reflecting member, and further reflects the light beam that is reflected by the polygon mirror and the reflecting member.

The light beam emitted from the light source is reflected by the second reflecting mirror and incident on the reflecting member. After being reflected by the reflecting member, the light beam is projected onto the polygon mirror where it is moved in the fast scan direction, and reflected again by the reflecting member. The light beam is reflected again by the second reflecting mirror.

Thus, the light beam is reflected two times by the second reflecting mirror. Therefore, the number of required optical elements is reduced. Further, the size of the optical scanning device 60 is reduced while securing required optical path lengths.

In the optical scanning device of the first invention, a third mirror for reflecting the light beams emitted from the light source and a fourth mirror for reflecting the light beam that is reflected by the third mirror toward the reflecting member are disposed between the light source and the reflecting member such that a plane defined by the optical axis of an optical path ranging from the light source to the fourth reflecting mirror is perpendicular to a plane defined by the optical axis of an optical path ranging from the third mirror to the polygon mirror.

With such an arrangement of the optical elements, the light beam that is emitted from the light source is reflected by the third reflecting mirror, and then by the fourth reflecting mirror, and incident on the reflecting member. The light beam that is reflected by the reflecting member is incident on the polygon mirror, and is moved in the fast scan direction by the polygon mirror, and reflected again by the reflecting member.

Since a plane defined by the optical axis of an optical path ranging from the light source to the fourth reflecting mirror is perpendicular to a plane defined by the optical axis of an optical path ranging from the third mirror to the polygon mirror, it never happens that the light beam, which is emitted from the light source and reflected by the third reflecting mirror, is incident on the fourth reflecting mirror while being twisted, and that the light beam, which is moved for scanning by the polygon mirror and reflected by the fourth reflecting mirror, is incident on the third reflecting mirror while being twisted. Therefore, the picture quality is improved.

To achieve the second object, the second invention provides an image forming apparatus comprising:

at least one optical scanning device of the first invention; and at least one photoreceptor, the optical scanning device forming an image on the surface of the photoreceptor with the light beam that is moved in the fast scan direction.

Since the image forming apparatus of the second invention uses the optical scanning devices of the first invention, the size thereof is reduced, and has reduced incident and reflecting angles of the light beam to and from the polygon mirror, thereby preventing the scanning line from being curved. Further, the image forming apparatus is free from the interruption of the optical path by the optical element.

The second invention provides an image forming apparatus comprising:

a plural number of image forming units, each of the image forming unit including an optical scanning device defined by any of claims 1 to 7, and a photoreceptor, the optical scanning device forming an image on the surface of the photoreceptor with the light beam that is moved in the fast scan direction.

Since the size of the image forming units are small, the image forming apparatus including the plural number of image forming units is also small in size.

DETAILED DESCRIPTION OF THE PREFERRED EMBODIMENTS

Figure 1:
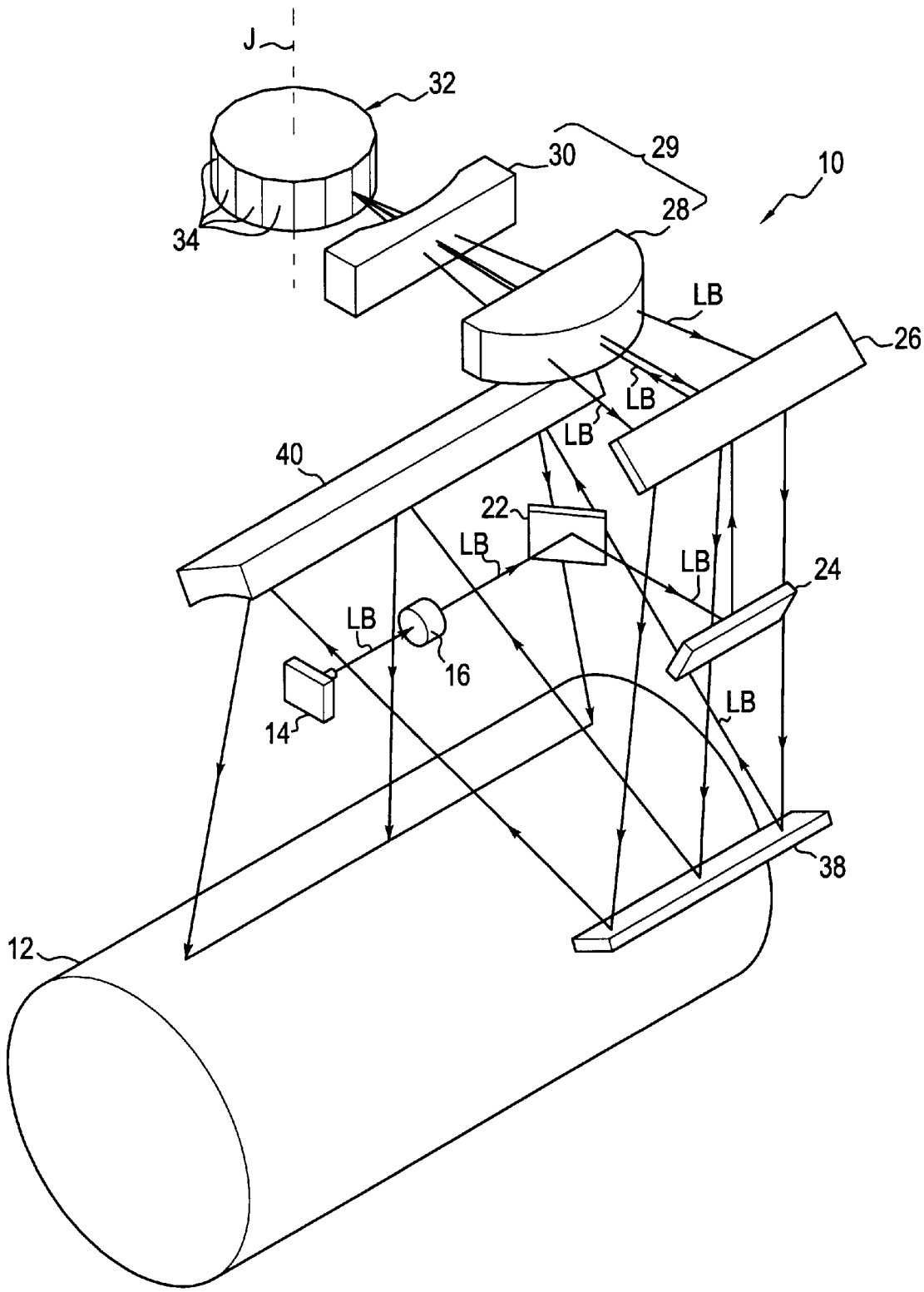
FIG. 1 is a perspective view showing a major portion of an optical scanning device which is a first embodiment of the present invention.
Figure 2:
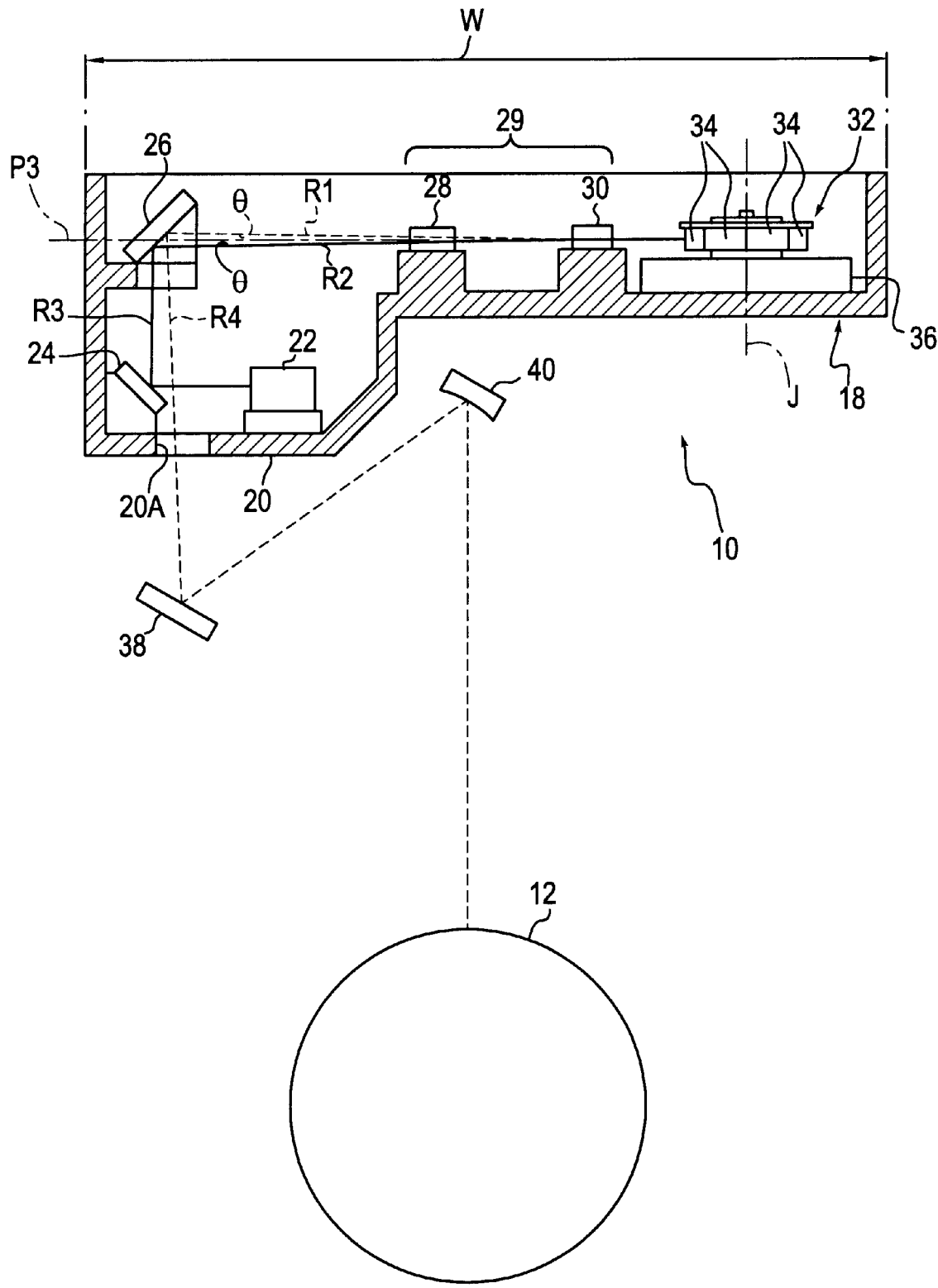
FIG. 2 is a sectional view showing a major portion of an optical scanning device of the first embodiment.

Referring to FIGS. 1 and 2, there is shown an optical scanning device 10 which is an embodiment of the present invention, and a photoreceptor drum 12 of which the surface is scanned with a light beam LB that is deflected and moved by the optical scanning device 10.

As shown in FIG. 1, the optical scanning device 10 includes a laser source 14 which emits a light beam LB, intensity modified by image information, in the same direction as the axial direction of the photoreceptor drum 12. The light beam LB emitted from the laser source 14 is collimated by a collimator lens 16 in the front of the laser source 14 when viewed in the beam emitting direction.

As shown in FIG. 1, the laser source 14 and the collimator lens 16 are mounted on a mounting plate portion 20 of a housing 18. In the illustration of FIG. 1, the laser source 14 and the collimator lens 16 are hidden by a third mirror 22 which is located in the front of the collimator lens 16 (when viewed in the beam emitting direction). The laser beam LB collimated by the collimator lens 16 is reflected, by the third mirror 22, and at a right angle to the incident beam direction.

Figure 4:
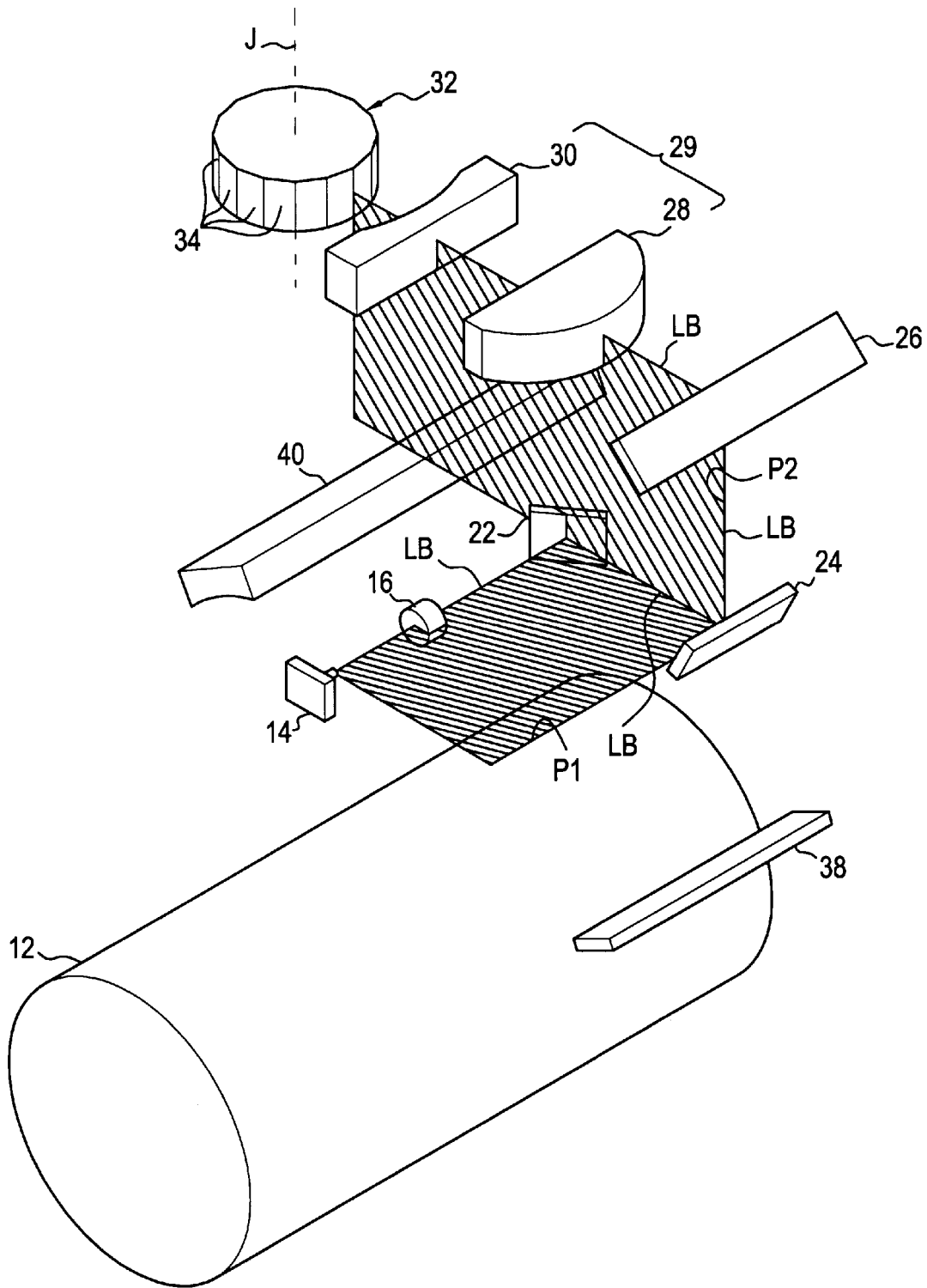
FIG. 4 is an explanatory diagram showing planes defined by the optical paths of the laser beam in the optical scanning device.

A fourth mirror 24 is mounted on the housing 18. The light beam LB that is reflected by the third mirror 22 is incident on the fourth mirror 24, and the fourth mirror 24 reflects the light beam upward. The light beam that is reflected by the fourth mirror 24 is somewhat slanted to the third mirror 22 (to the right in FIG. 2) with respect to the vertical direction. The optical axis of the optical path of the light beam LB, which ranges from the laser source 14 through the third mirror 22 to the fourth mirror 24, defines one plane P1 as shown in FIG. 4.

A first mirror 26 is mounted on the housing 18 while being located above the fourth mirror 24. The light beam LB, which is reflected upward by the fourth mirror 24, is reflected in a substantially horizontal direction (to the right in FIG. 2) by the first mirror 26.

The light beam LB passes through a fθ-lens 29 made up of lenses 28 and 30, firmly attached to the housing 18, and is incident on a small mirror face or facet 34 of a polygon mirror 32. The optical axis of the optical path, which ranges from the third mirror 22 to the facet 34 of the polygon mirror 32 through the fourth mirror 24 and the first mirror 26, defines one plane P2 as shown in FIG. 4. The plane P1 orthogonally intersects the plane P2. Therefore, the light beam LB that is reflected by the third mirror 22, fourth mirror 24 and first mirror 26 is little twisted, leading to improvement of the reproduced picture quality.

The polygon mirror 32 is a regular polygonal prism having a plural number of facets 34. The polygon mirror 32 is rotated about the rotary shaft J by a motor 36, at a given angular speed. The rotary shaft J is extended in the direction perpendicular to the upper and lower surfaces thereof. With the rotation of the polygon mirror 32, the light beam LB is incident on and reflected by each facet 34 of the polygon mirror 32, while being deflected for scanning at an equal angular speed. In the description to follow, the direction in which the light beam LB is deflected for scanning by the polygon mirror 32 is defined as a "fast scan direction"; a plane that is perpendicular to the fast scan direction and includes the rotary shaft J is defined as a "slow scan plane" (incidentally, the plane P2 is located within the slow scan plane.); and the direction perpendicular to the fast scan direction is defined as a "slow scan direction".

Figure 3:
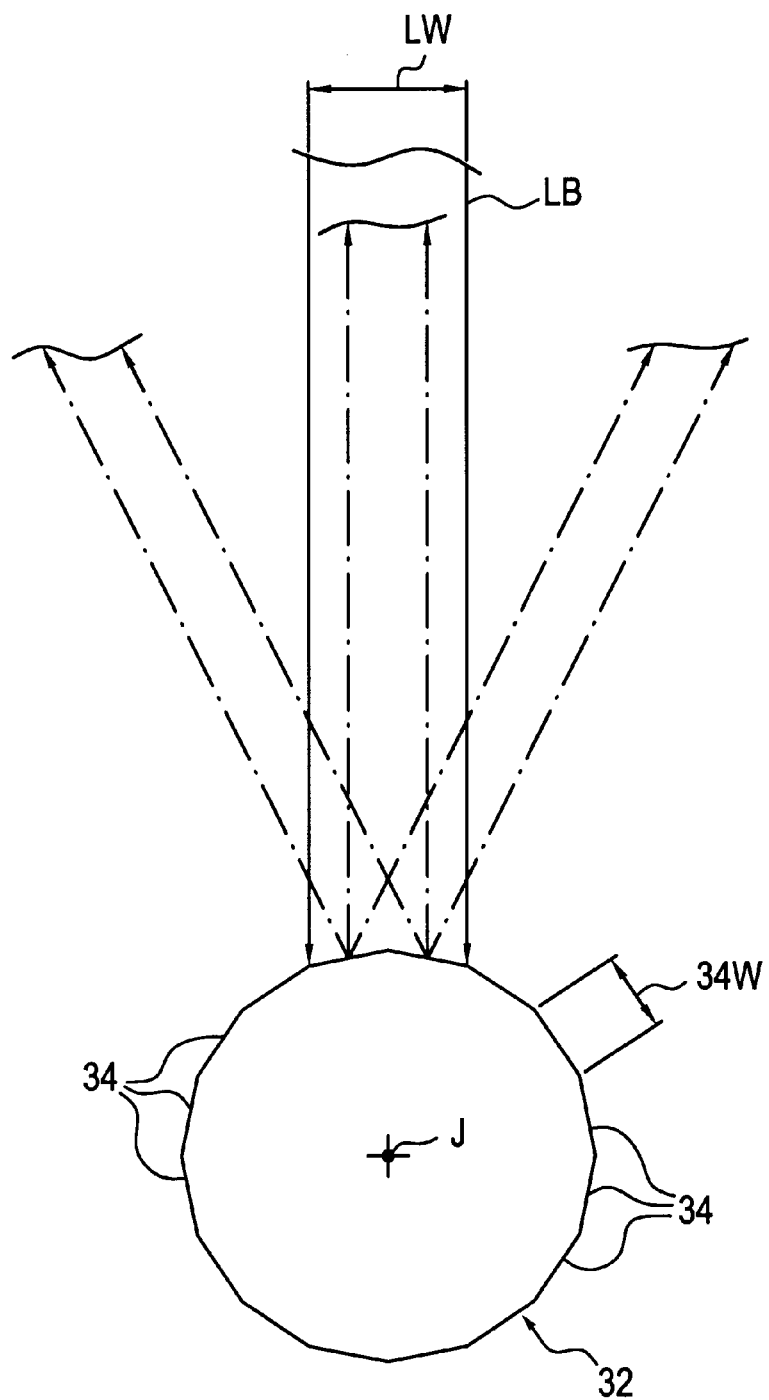
FIG. 3 is an explanatory diagram showing a relationship between a polygon mirror and a laser beam in the optical scanning device.

As shown in FIG. 3, the light beam LB is processed by the collimator lens 16 such that the width LW of the light beam LB (when viewed in the fast scan direction) is wider than the facet width 34W of each facet 34 (a called over-field optical system is employed) and it is focussed on the facet 34 (when viewed in the slow scan direction). Use of the over-field optical system, viz. width LW>facet width 34W, brings about the following advantages. The number of facets 34 may be increased not entailing an increase of the size of the polygon mirror 32. A picture of high quality and high resolution can be reproduced by rotating the polygon mirror 32 at high speed.

The light beam LB, which is directed by the first mirror 26 toward the polygon mirror 32 (this light beam will be referred to as an "incident light beam"), is projected onto each facet 34 of the polygon mirror 32, from a position (first position) bleow a plane P3, which is perpendicular to the rotary shaft J of the polygon mirror 32. That is, the incident light beam advances from the first position on the first mirror 26 to the face of the polygon mirror while being slanted upward at an angle (incident angle) θ with respect to the plane P3 (FIG. 2). The light beam LB, which is reflected on each facet 34 of the polygon mirror 32 (this light beam will be referred to as a "reflecting light beam".), hits another position (second position) located above the plane P3 on the surface of the first mirror 26. That is, the light beam LB advances from the facet of the polygon mirror to the second position on the first mirror 26, while being slanted upward at an angle (reflecting angle) θ (=incident angle θ) with respect to the plane P3. Therefore, the optical path of the incident light beam is sufficiently separated from that of the reflecting light beam; those optical paths do not interfere with each other in any way. The incident angle θ is selected to be small so as to minimize a vertical shift of the reflecting point on the facet 34 of the polygon mirror 32 and hence, to prevent the scanning line from being curved.

The first mirror 26 and the polygon mirror 32 are positioned so that the incident light beam advances to the rotary shaft J of the polygon mirror 32 (viz., a called front incidence is used) (FIG. 3).

The reflecting light beam, which is reflected at the reflecting angle θ on the facet 34, passes again through the fθ-lens 29 (viz., a called double-pass optical system is used) (FIGS. 1 and 2). The fθ-lens 29 has a power only in the fast scan direction. With this, the light beam LB is moved at a fixed speed in the fast scan direction when it is incident on the photoreceptor drum 12. Further, the light beam LB is converged in the fast scan direction and focussed on the surface of the photoreceptor drum 12. After collimated by the collimator lens 16, the light beam LB is converted in the slow scan direction by a cylindrical lens or a spherical lens, both not shown, and reflected on the facet 34, and converged again by a cylindrical mirror 40 and focussed on the photoreceptor drum 12 surface.

After passing through the fθ-lens 29, the light beam LB is incident again on the first mirror 26, which in turn reflects the light beam LB downward.

The optical path R1 of the incident light beam and the optical path R2 of the reflecting light beam become apart from each other as a distance from the polygon mirror 32 increases, as shown in FIG. 2. Accordingly, the optical path R4 of the light beam LB, which is reflected downward by the first mirror 26, is further apart from the optical path R3 of the light beam LB ranging from the fourth mirror 24 to the first mirror 26. The result is that the light beam LB that is reflected substantially downward by the first mirror 26 is not directed to the third mirror 22 but passes through a through-hole 20A (FIG. 2) formed in the bottom of the housing 18, and impinges on a reflecting mirror 38, which is provided outside the housing 18. Then, the light beam LB is reflected obliquely and upward by the reflecting mirror 38, and hits a cylindrical mirror 40. The cylindrical mirror 40 has a power only in the slow scan direction, and functions to correct a variation of the scanning line orientation caused by a tilting of the facets 34 of the polygon mirror 32 (performs a called facet-tilting correction).

The light beam LB that is reflected substantially downward by the cylindrical mirror 40 is directed to and incident on the surface of the photoreceptor drum 12. With the rotation of the polygon mirror 32, the light beam LB is moved in the fast scan direction on the surface of the photoreceptor drum 12. The photoreceptor drum 12 is rotated by a drive means, e.g., a motor. With the rotation of the photoreceptor drum 12, the light beam LB is moved in the slow scan direction on the surface of the photoreceptor drum 12. Through the combination of the movements of the light beam LB in the fast and slow scan directions, a latent image is formed on the surface of the photoreceptor drum 12.

An operation of the thus constructed optical scanning device 10 will be described.

A light beam LB that is emitted from the laser source 14 is collimated by the collimator lens 16; the laser beam is successively reflected by the third mirror 22, fourth mirror 24 and first mirror 26; and the laser beam is incident on the facets 34 of the polygon mirror 32. The laser beam is deflected for scanning in the fast scan direction by a movement of each facet 34 of the polygon mirror 32, caused by the rotation of the polygon mirror 32. The light beam LB then passes through the fθ-lens 29; it is reflected again by the reflecting mirror 38 and the cylindrical mirror 40; and it is incident on the surface of the photoreceptor drum 12.

Thus, the light beam LB that is emitted from the laser source 14 is reflected at a right angle by the third mirror 22, and then is incident on the fourth mirror 24. This unique arrangement of the optical elements has a large design freedom in laying out optical elements when comparing with such an arrangement of optical elements that the light beam LB, after being emitted from the laser source 14, advances straightforwardly to and is incident on the fourth mirror 24. In the latter arrangement, the cylindrical mirror 40 and the laser source 14 must be disposed under the fθ-lens 29 or the polygon mirror 32 so as to avoid the interruption of the optical path of the light beam LB by the cylindrical mirror 40. Therefore, a designer is limited in laying out those optical elements.

In the optical scanning device of the embodiment, the light beam that is reflected by the first mirror 26 is incident on each facet 34 of the polygon mirror 32, and the reflecting beam from each facet is reflected again by the first mirror.

With this optical element arrangement, the first mirror 26 may be disposed close to the polygon mirror 32 in a state that the incident angle θ of the incident light beam is kept at a given small angle and the first mirror 26 does not interrupt the optical path of the incident light beam or the reflecting light beam. This unique arrangement of the optical elements provides the following advantages: 1) Deterioration of the picture quality caused by the curving of the scanning line is almost removed; and 2) The width W of the optical scanning device 10 is reduced while preventing the first mirror 26 from interrupting the optical path of the incident light beam or the reflecting light beam.

The incident light beam impinges on each facet 34 of the polygon mirror 32 in the front incidence manner. This feature provides the following advantages. Even if the scanning line is somewhat curved, the curving of the scanning line is symmetrical with respect to the slow scan plane, thereby little deteriorating the picture quality. Further, the width of the light beam LB projected onto each facet 34 of the polygon mirror 32 is minimized since the front incidence is used. The minimized beam width allows the facet width 34W of the polygon mirror 32 to be decreased. Therefore, the facets 34 of the polygon mirror 32 may be increased in number, or the polygon mirror 32 may be reduced in size. The size reduction leads to the reduction of the load to the motor 36.

In the optical scanning device 10 of the embodiment, the lenses 28 and 30 of the fθ-lens 29 are disposed between the polygon mirror 32 and the first mirror 26. When the optical paths of the incident and reflecting light beams between the polygon mirror 32 and the first mirror 26 are compared with those between the first mirror 26 and the third mirror 22, the former light paths are less spaced from each other than the latter ones. Therefore, even if the height of the lenses 28 and 30 are reduced, those lenses allow both the incident light beam and the reflecting light beam to pass therethrough. If occasion demands, the lenses 28 and 30 may be disposed between the first mirror 26 and the third mirror 22.

Figure 5:
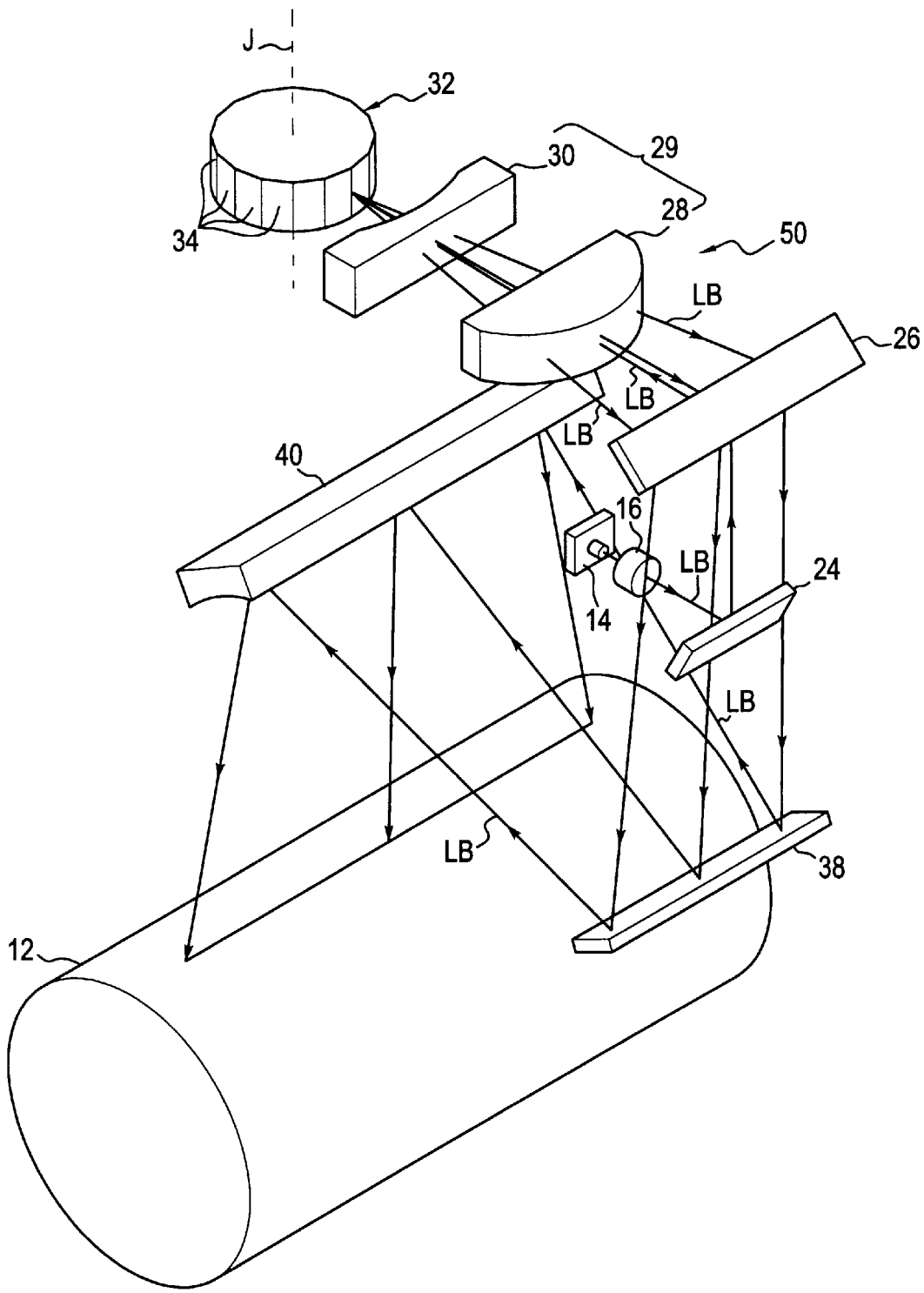
FIG. 5 is a perspective view showing a major portion of an optical scanning device which is a second embodiment of the present invention.

FIG. 5 is a perspective view showing a major portion of an optical scanning device 50 which is a second embodiment of the present invention. In the figure, like reference numerals are used for designating like or equivalent portions in the figures that were used for explaining the optical scanning device 10 of the first embodiment of the present invention.

An optical element corresponding to the third mirror 22 used in the first embodiment of the invention is not used in the optical scanning device 50. In the second embodiment, a light beam LB that is emitted from the laser source 14 is collimated by the collimator lens 16, and it then advances straight ahead and is reflected substantially upward by the fourth mirror 24. Thereafter, the laser beam LB traces the same optical path as in the optical scanning device 10 of the first embodiment. The optical path ranging from the laser source 14 to each facet 34 of the polygon mirror 32 defines one plane (corresponding to the plane P1 in FIG. 4). Therefore, the light beam LB is little twisted, resulting in improvement of the picture quality.

The optical scanning device of the second embodiment is advantageous in that the number of required optical elements is reduced since the optical element corresponding to the third mirror 22 used in the first embodiment is not used.

Figure 6:
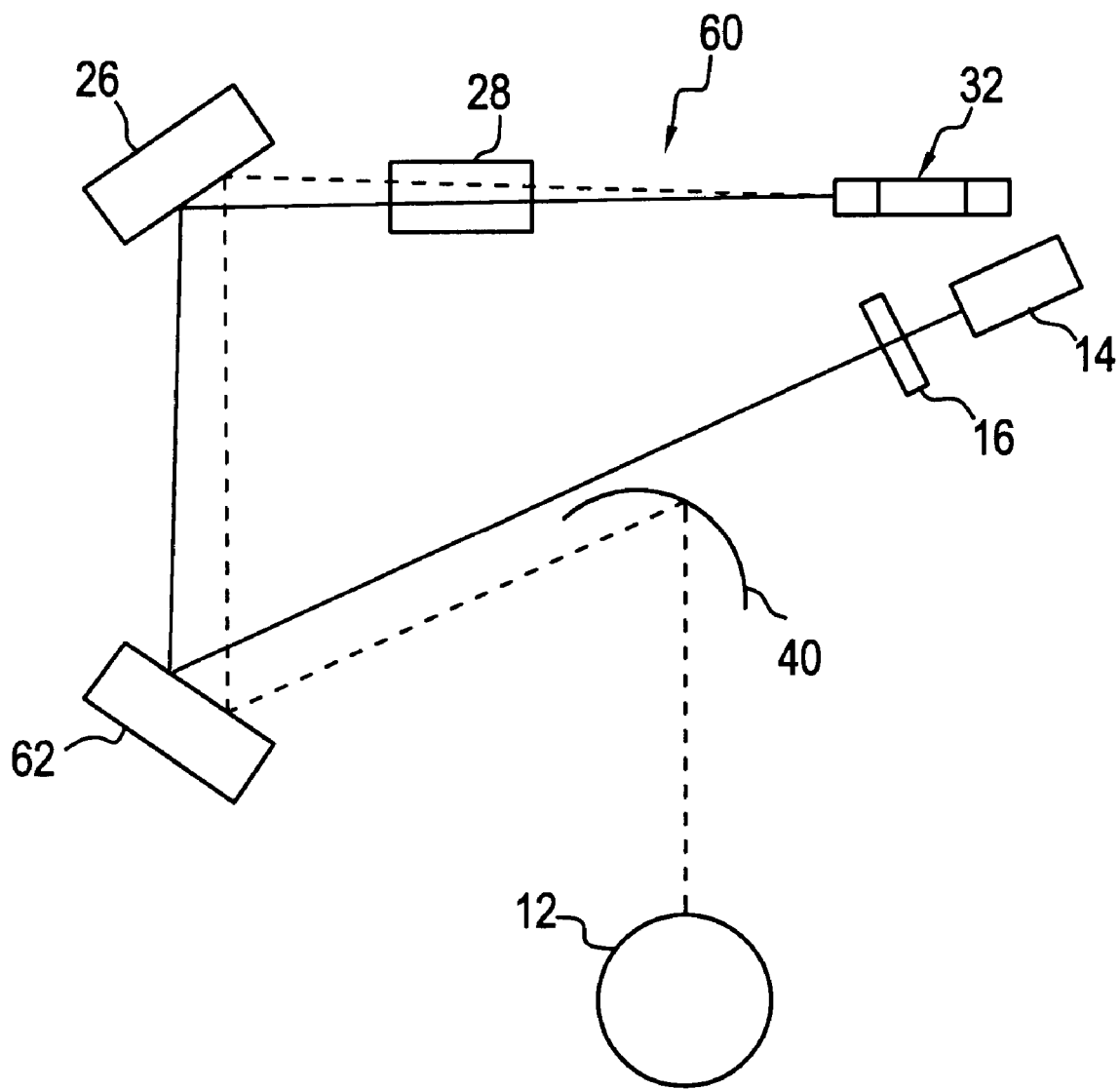
FIG. 6 is a side view schematically showing a major portion of an optical scanning device which is a third embodiment of the present invention.

FIG. 6 is a side view schematically showing a major portion of an optical scanning device which is a third embodiment of the present invention.

A second mirror 62 is additionally used in the optical scanning device of the third embodiment, while the optical elements corresponding to the third mirror 22 and the fourth mirror 24 are not used.

A light beam LB that is reflected by the second mirror 62 is reflected by the first mirror 26, and then passes through the fθ-lens 29, and is incident on the surface of each facet 34 of the polygon mirror 32.

The light beam LB that is deflected for scanning through the rotation of the polygon mirror 32 passes again through the fθ-lens 29; it is reflected by the first mirror 26; and it is incident on the second mirror 62. The light beam LB that is reflected by the second mirror 62 is further reflected by the cylindrical mirror 40 and then it is incident on the surface of the photoreceptor drum 12.

Thus, in the third embodiment, the light beam LB is reflected two times by the second mirror 62 as by the first mirror 26. Therefore, the number of required optical elements is reduced. Further, the size of the optical scanning device 60 is reduced while securing required optical path lengths.

Figure 7:
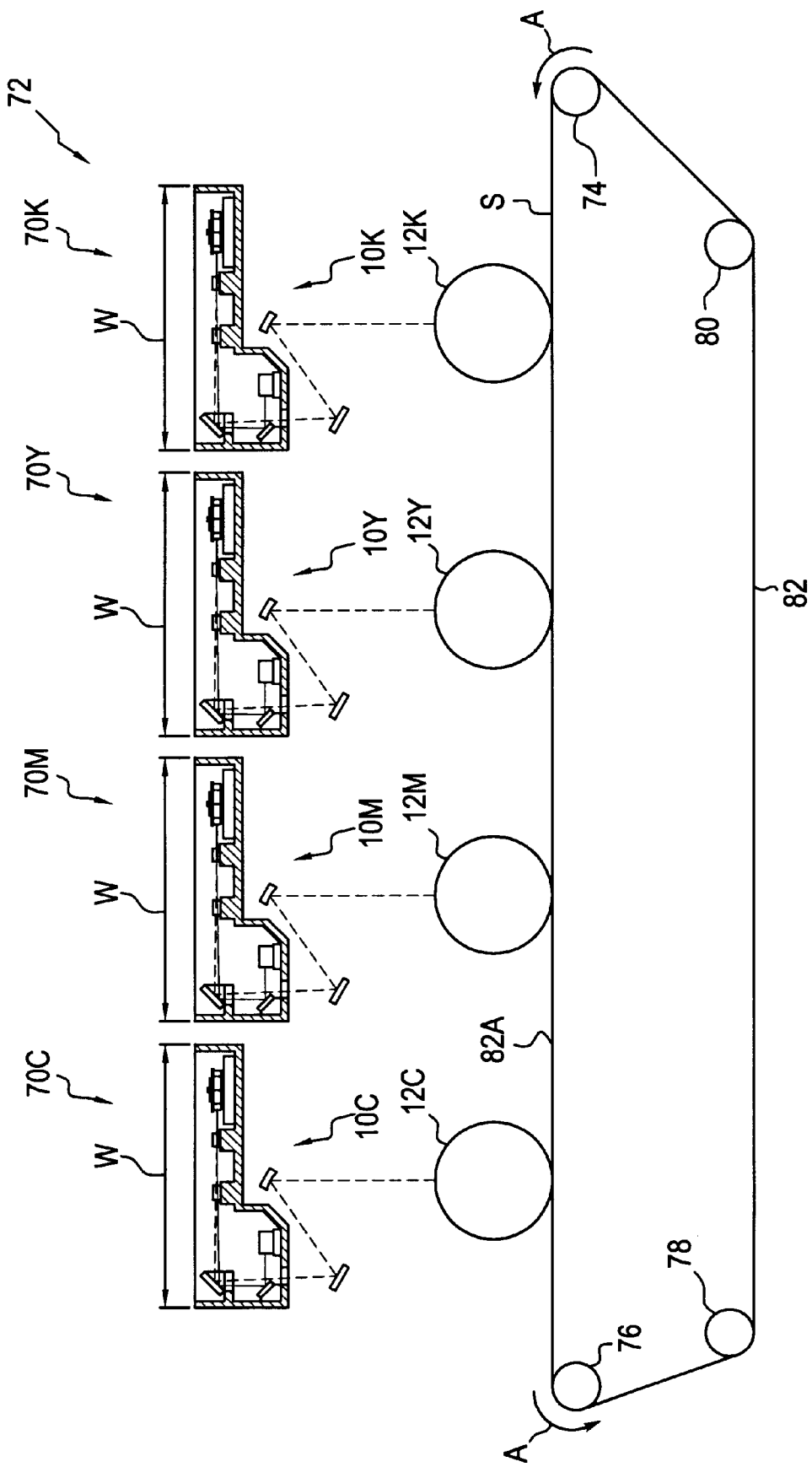
FIG. 7 is a sectional view schematically showing a major portion of an image forming apparatus using a plural number of optical scanning devices each of which is the first embodiment of the present invention.

FIG. 7 is a sectional view schematically showing a major portion of an image forming apparatus using a plural number of optical scanning devices each of which is the first embodiment of the present invention. In the figure, the image forming apparatus takes the form of a color laser printer 72. As shown, the color laser printer 72 includes four image forming units 70K, 70Y, 70M and 70C (those units are generally indicated by numeral 70). These image forming units 70 are each made up of an optical scanning device generally indicated by numeral 10 (10K, 10Y, 10M, 10C) and a photoreceptor drum generally indicated by 12 (12K, 12Y, 12M, 12C). Those optical scanning devices 10 are constructed according to the same principle as of the optical scanning device of the first embodiment. In the color laser printer 72, the image forming units 70K, 70Y, 70M and 70C form color images of K (black), Y (yellow), M (magenta) and C (cyan), respectively.

In the printer, an endless transport belt 82 is wound on four rollers 74, 76, 78 and 80. The transport belt 82 is rotated at a constant speed in the direction of an arrow A (counterclockwise). The transport belt 82 is flat between the rollers 74 and 76, and an image recording medium (e.g., a sheet of paper) S is put on this flat portion 82A of the transport belt 82 and transported.

The image forming units 70K, 70Y, 70M and 70C are equidistantly disposed above the flat portion 82A of the transport belt 82, while being arrayed equidistantly in the direction orthogonal to the axes of the photoreceptor drums 12K, 12Y, 12M and 12C. Those photoreceptor drums are in contact with the flat portion 82A of the transport belt 82.

The sheet S that is put on the flat portion 82A is transported with the rotation of the transport belt 82, while being successively nipped between the bottoms of the circumferential outer surfaces of the photoreceptor drums 12K, 12Y, 12M and 12C and the flat portion 82A. During the transportation of the sheet S, toner images of different colors are transferred from the photoreceptor drums 12K, 12Y, 12M and 12C onto the sheet S in successive and superposing manner. At the downstream end of the flat portion 82A, the transport belt 82 is guided downward by the rollers 76 and 78, while the sheet S is stripped off from the transport belt 82. After parted from the transport belt 82, the sheet S enters a fixing stage (not shown) where the color toner images on the sheet S are fused and fixed on the sheet, whereby a full-color image is formed on the sheet.

The color laser printer 72 shown in FIG. 7 uses four separate image forming units 70K, 70Y, 70M and 70C. The number of image forming units is not limited to four, but may be larger or smaller than four. For example, a single image forming unit or five or larger number of image forming units may be used for constructing the printer. While the photoreceptor takes the form of a drum in the FIG. 7 instance, it may takes the form of belts, which are provided in association with the image forming units. The photosensitive surface of the photoreceptor may be segmented, in the fast or slow scan direction, into a plural number of segmental surfaces. In this case, the image forming units corresponding in number to the segmental surfaces are used for scanning those surfaces. The optical scanning device, which forms the image forming unit, may be the optical scanning device 50 (second embodiment) or the optical scanning device 60 (third embodiment).

The first mirror 26 and the second mirror 62 are each a single piece of the mirror in each above-mentioned embodiment. If required, the first mirror 26 may be constructed with two separate mirrors; one for receiving the light beam LB from the third mirror and the other for receiving the light beam LB from the polygon mirror 32. In this case, those mirrors may be located close to the polygon mirror 32 within a range out of which the mirrors interrupt the optical path, and the incident and reflecting angles θ may be reduced, so long as the reflecting surfaces of the two mirrors are put in a plane or flush with each other. Therefore, the size of the image forming apparatus may be reduced without adversely affecting the picture quality. Incidentally, where each of those mirrors includes a single piece of mirror, the number of required optical elements is reduced, as a matter of course.

Figure 8:
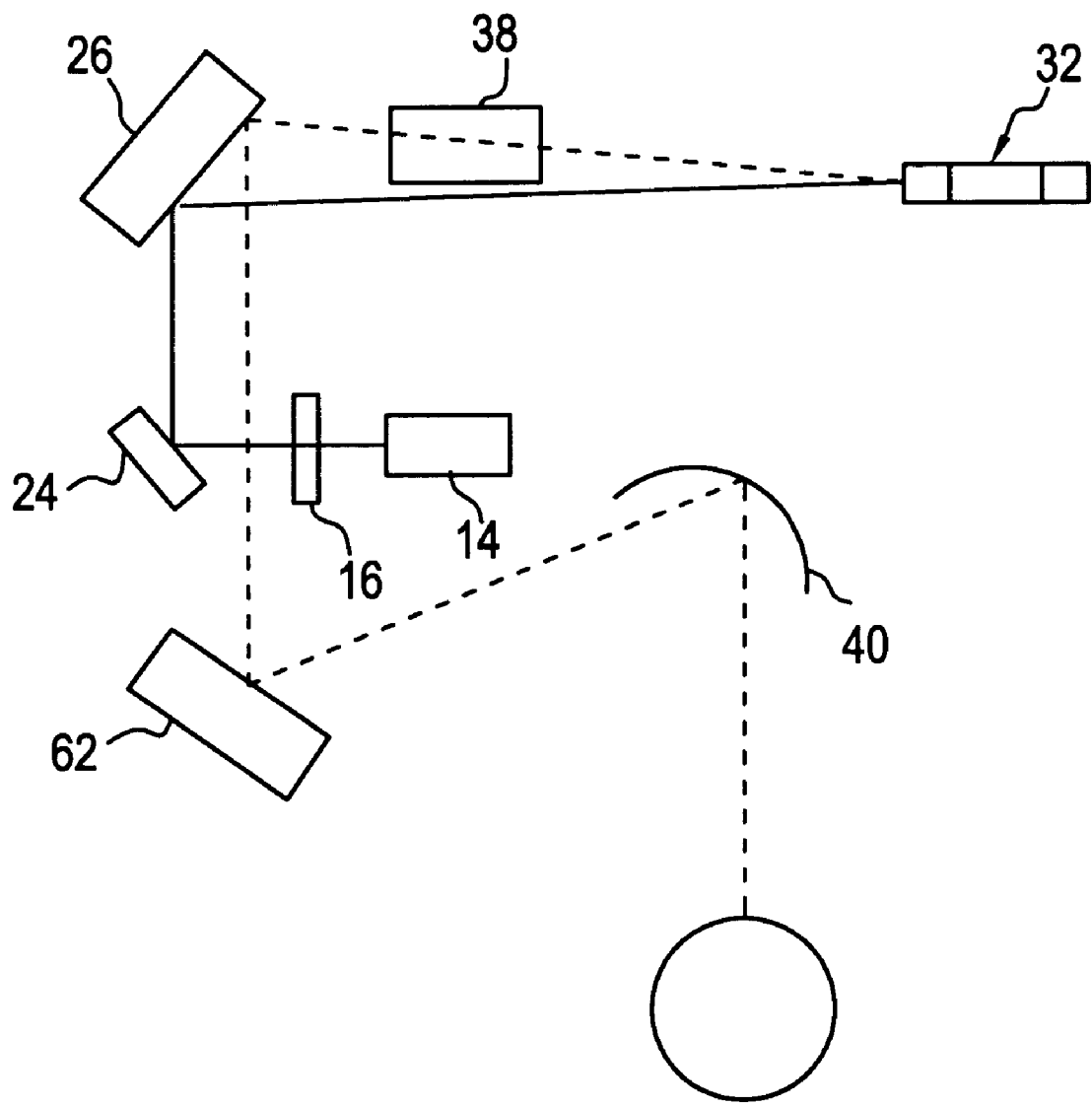
FIG. 8 is a side view schematically showing a major portion of an optical scanning device which is a fourth embodiment of the present invention.
Figure 9:
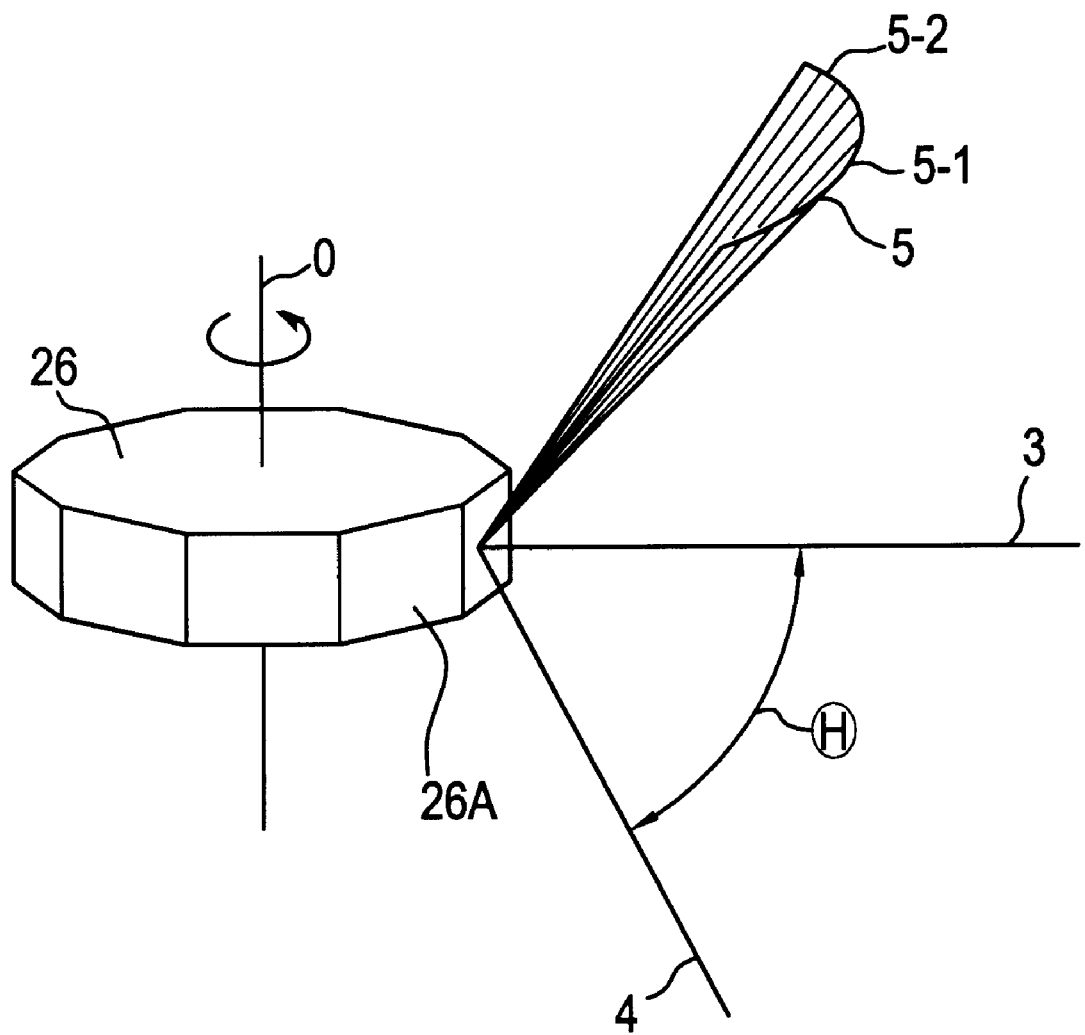
FIG. 9 is a diagram useful in explaining the curving of a light beam when the incident and reflecting angles of the light beam to and from a rotary polygon mirror are large.

The fθ-lens 29 including the lenses 28 and 30, which is located between the polygon mirror 32 and the first mirror 26, allows both the incident and reflecting light beams to pass therethrough, in the above-mentioned embodiment. An embodiment of the invention shown in FIG. 8 uses a fθ-lens 38 which allows only the reflecting light beam to pass therethrough. In this instance, no consideration must be given to the passage of the incident light beam in designing the lens. Therefore, the height of the reflecting mirror 38 may be more reduced than the fθ-lens 29. The lens located between the polygon mirror 32 and the first mirror 26 may be a suitable optical transmitting element, e.g., an image forming lens, in place of the fθ-lens 29 (38). Also in this case, the advantage of the lens height reduction is obtained.

While the over-field optical system is applied to the optical scanning devices of the above-mentioned embodiments, it is evident that the under-field optical system may be applied to the optical scanning devices.

The first invention provides an optical scanning device comprising:

a light source for emitting a light beam;
   a polygon mirror for receiving the light beam from the light source and reflecting the light beam, the light beam being reflected while being moved in a fast scan direction with the rotation of the polygon mirror; and
   a reflecting member having a reflecting surface positioned in a plane, the reflecting surface receiving the light beam from the light source and reflecting the light beam toward the polygon mirror, the light beam reflected by the reflecting surface being obliquely incident on each facet of the polygon mirror from a point high above another plane perpendicular to the rotary shaft of the polygon mirror, and the reflecting surface of the reflecting member receiving the light beam reflected by each face of the polygon mirror and reflecting again the received light beam. Since the optical scanning device is thus constructed, the size thereof is reduced, and has reduced incident and reflecting angles of the light beam to and from the polygon mirror, thereby preventing the scanning line from being curved. Further, the optical scanning device is free from the interruption of the optical path by the optical element.

The second invention provides an image forming apparatus comprising:

at least one optical scanning device of the first invention; and at least one photoreceptor, the optical scanning device forming an image on the surface of the photoreceptor with the light beam that is moved in the fast scan direction.

Since the optical scanning device is thus constructed, the size thereof is reduced, and has reduced incident and reflecting angles of the light beam to and from the polygon mirror, thereby preventing the scanning line from being curved. Further, the image forming apparatus is free from the interruption of the optical path by the optical element.

As described above, a single reflecting mirror is disposed in the optical scanning device constructed according to the present invention. In device design, there is no need of considering the interruption of the light beams by the reflecting mirrors, which is essential to the conventional optical scanning device. The reflecting mirror may be disposed sufficiently close to the polygon mirror. The result is that the distance from the polygon mirror to the reflecting mirror may be reduced and hence, the size of the optical scanning device is reduced.

The relative positions of the light source, two mirrors and the polygon mirror must be adjusted in the conventional optical scanning device using two reflecting mirrors. The position adjustment is complicated and troublesome. In the optical scanning device of the invention using the single reflecting mirror, the light beam that is first directed by the reflecting mirror to the polygon mirror advances to and hits a reflected image on the face of the polygon mirror, and the light beam that is last reflected by the mirror is reflected thereby as if it is emitted from the reflected image. With this feature, the relative positions of the mirror and the like may be adjusted while observing the reflected image. Further, there is no need of the mirror-to-mirror adjustment, as a matter of course. For this reason, the position adjustment is simple and easy in the optical scanning device of the invention.

What is claimed is:

1. An optical scanning device comprising:

a light source for emitting a light beam;

a polygon mirror for receiving the light beam and reflecting the light beam at most one, the light beam being reflected while being moved in a fast scan direction with the rotation of said polygon mirror; and a reflecting member having a reflecting surface, said reflecting surface receiving the light beam from said light source and reflecting the light beam towards said polygon mirror, the light beam reflected by said reflecting surface being directed to the axis of a rotary shaft of the polygon mirror and obliquely incident on each facet of said polygon mirror from a point outside a plane that is perpendicular to the rotary shaft of said polygon mirror and passes through a point where the light beam is reflected by said polygon mirror, and said reflecting surface of said reflecting member receiving the light beam reflected by each said face of said polygon mirror and reflecting again the received light beam.

2. The optical scanning device of claim 1, wherein said reflecting member includes a first reflecting mirror.

3. The optical scanning device of claim 1, wherein an fθ-lens is disposed so as to allow the light beam to be incident on said polygon mirror and the light beam reflected by said polygon mirror to pass therethrough.

4. The optical scanning device of claim 1, wherein a second mirror is disposed between said light source and said reflecting member, said second mirror reflecting the light beam emitted from said light source toward said reflecting member, and further reflecting the light beam that is reflected by said polygon mirror and said reflecting member.

5. The optical scanning device of claim 1, wherein a second mirror for reflecting the light beams emitted from said light source, and a third mirror for reflecting the light beam that is reflected by said second mirror toward said reflecting member are disposed between said light source and said reflecting member such that a second plane defined by the optical axis of an optical path ranging from said light source to said third reflecting mirror is perpendicular to a plane defined by the optical axis of an optical path ranging from said second mirror to said polygon mirror.

6. An image forming apparatus comprising:

said optical scanning device of claim 1; and at least one photoreceptor, said optical scanning device forming an image on the surface of said photoreceptor with the light beam that is moved in the fast scan direction.

7. An image forming apparatus comprising:

a plural number of image forming units, each of said image forming unit including;

said optical scanning device of claim 1, and;

a photoreceptor, said optical scanning device forming an image on the surface of said photoreceptor with the light beam that is moved in the fast scan direction.

8. An optical scanning device comprising:

a light source for emitting a light beam;

a polygon mirror for receiving the light beam and reflecting the light beam at most once, the light beam being reflected while being moved in a fast scan direction with the rotation of said polygon mirror; and a reflecting member having a planar reflecting surface, said planar reflecting surface receiving the light beam from said light source and reflecting the light beam towards said polygon mirror, the light beam reflected by said reflecting surface being incident on a facet of said polygon mirror, and said planar reflecting surface of said reflecting member receiving the light beam reflected by said facet of said polygon mirror and reflecting again the received light beam.

9. The optical scanning device of claim 8, wherein said reflecting member is disposed so that the light beam to be incident on said polygon mirror is directed to the axis of the rotary shaft of said polygon mirror.

10. The optical scanning device of claim 8, further comprising:

an fθ-lens disposed so as to allow the light beam to be incident on said polygon mirror and the light beam reflected by said polygon mirror to pass therethrough.

11. The optical scanning device of claim 8, further comprising:

a second mirror disposed between said light source and said reflecting member, said second mirror reflecting the light beam emitted from said light source toward said reflecting member, and further reflecting the light beam that is reflected by said polygon mirror and said reflecting member.

12. An image forming apparatus comprising:

said optical scanning device of claim 8; and at least one photoreceptor, said optical scanning device forming an image on the surface of said photoreceptor with the light beam that is moved in the fast scan direction.

13. An optical scanning device comprising:

a light source for emitting a light beam;

a polygon mirror for receiving the light beam and reflecting the light beam at most once, the light beam being reflected while being moved in a fast scan direction with the rotation of said polygon mirror;

a reflecting member having a reflecting surface, said reflecting surface receiving the light beam from said light source and reflecting the light beam towards said polygon mirror, the light beam reflected by said reflecting surface being obliquely incident on a facet of said polygon mirror from a point outside of a plane that is perpendicular to a rotary shaft of the polygon mirror and passes through a point where the light beam is reflected by the polygon mirror, and said reflecting surface of said reflecting member receiving the light beam reflected by said facet of said polygon mirror and reflecting again the received light beam; and an f$\theta$-lens disposed so as to allow the light beam to be incident on said polygon mirror and the light beam reflected by said polygon mirror to pass therethrough.

14. The optical scanning device of claim 13, wherein said f$\theta$-lens is disposed between said polygon mirror and said reflecting member.

15. An image forming apparatus comprising:

said optical scanning device of claim 13; and at least one photoreceptor, said optical scanning device forming an image on the surface of said photoreceptor with the light beam that is moved in the fast scan direction.

16. An optical scanning device comprising:

a light source for emitting a light beam;

a polygon mirror for receiving the light beam and reflecting the light beam at most once, the light beam being reflected while being moved in a fast scan direction with the rotation of said polygon mirror;

a reflecting member having a reflecting surface, said reflecting surface receiving the light beam from said light source and reflecting the light beam towards said polygon mirror, the light beam reflected by said reflecting surface being obliquely incident on a facet of said polygon mirror from a point outside of a plane that is perpendicular to a rotary shaft of the polygon mirror and passes through a point where the light beam is reflected by the polygon mirror, and said reflecting surface of said reflecting member receiving the light beam reflected by said facet of said polygon mirror and reflecting again the received light beam; and a second mirror disposed between said light source and said reflecting member, said second mirror reflecting the light beam emitted from said light source toward said reflecting member, and further reflecting the light beam that is reflected by said polygon mirror and said reflecting member.

* * * * *